US012732545B2

United States Patent

(12) United States Patent
Nayak et al.

(10) Patent No.: US 12,732,545 B2
(45) Date of Patent: Sep. 8, 2026

(54) APPARATUS, METHOD, AND COMPUTER PROGRAM

(71) Applicant: Nokia Technologies Oy, Espoo (FI)

(72) Inventors: Ashok Kumar Nayak, Bangalore (IN); Devaki Chandramouli, Dallas, TX (US)

(73) Assignee: Nokia Technologies Oy, Espoo (FI)

( * ) Notice: Subject to any disclaimer, the term of this patent is extended or adjusted under 35 U.S.C. 154(b) by 374 days.

(21) Appl. No.: 17/999,042

(22) PCT Filed: May 4, 2021

(86) PCT No.: PCT/EP2021/061680
§ 371 (c)(1),
(2) Date: Nov. 16, 2022

(87) PCT Pub. No.: WO2021/233677
PCT Pub. Date: Nov. 25, 2021

(65) Prior Publication Data

US 2023/0179989 A1 Jun. 8, 2023

(30) Foreign Application Priority Data

May 21, 2020 (IN) ............................ 202041021414

(51) Int. Cl.
*H04L 65/10* (2022.01)
*H04L 41/0893* (2022.01)
*H04W 8/20* (2009.01)

(52) U.S. Cl.
CPC ......... *H04L 65/1013* (2013.01); *H04W 8/205* (2013.01); *H04L 41/0893* (2013.01)

(58) Field of Classification Search
CPC ............. H04L 41/0806; H04L 41/0893; H04L 65/1013; H04W 8/12; H04W 8/205
See application file for complete search history.

(56) References Cited

U.S. PATENT DOCUMENTS

2007/0101118 A1 5/2007 Raghunath et al.
2016/0165432 A1* 6/2016 Dubesset .............. H04W 76/12 455/433

(Continued)

FOREIGN PATENT DOCUMENTS

JP 2004-186817 A 7/2004
WO 2021/045573 A1 3/2021

OTHER PUBLICATIONS

"3rd Generation Partnership Project; Technical Specification Group Services and System Aspects; Study on enhanced support of non-public networks (Release 17)", 3GPP Standard; Technical Report; 3GPP TR 23.700-07, No. V0.3.0 Jan. 28, 2020 (Jan. 28, 2020), pp. 1-42, XP051860849.*

(Continued)

*Primary Examiner* — Diane D Mizrahi
(74) *Attorney, Agent, or Firm* — Nokia Technologies Oy

(57) ABSTRACT

An apparatus comprising: at least one processor; and at least one memory including computer program code; the at least one memory and the computer program code configured to, with the at least one processor, cause the apparatus at least to: determine that an onboarding standalone non private network and/or service provider hosting the apparatus does not own subscription data for a terminal, in response to the terminal performing an initial access to the onboarding standalone non private network and/or service provider; obtain subscription data for the terminal owned by another standalone non private network and/or service provider from a central provisioning server; and provide subscription data to the terminal.

17 Claims, 8 Drawing Sheets

(56) References Cited

U.S. PATENT DOCUMENTS

| | | | | |
|---|---|---|---|---|
| 2020/0068445 | A1* | 2/2020 | Wu | H04W 36/1443 |
| 2020/0329008 | A1* | 10/2020 | Dao | H04L 61/5007 |
| 2021/0058784 | A1* | 2/2021 | Kedalagudde | H04W 76/12 |
| 2021/0211975 | A1* | 7/2021 | Prabhakar | H04W 8/12 |
| 2022/0353680 | A1* | 11/2022 | Hu | H04W 12/069 |
| 2022/0408333 | A1* | 12/2022 | Ryu | H04W 76/10 |
| 2023/0099786 | A1* | 3/2023 | Xiang | H04W 48/18<br>370/329 |
| 2023/0156457 | A1* | 5/2023 | Liu | H04W 60/04<br>455/418 |
| 2023/0164194 | A1* | 5/2023 | Foti | H04W 8/205<br>370/329 |
| 2023/0171603 | A1* | 6/2023 | Garcia Martin | H04W 60/04<br>455/410 |
| 2023/0179989 | A1* | 6/2023 | Nayak | H04L 65/1013<br>455/558 |
| 2024/0224163 | A1* | 7/2024 | Starsinic | H04W 48/12 |

OTHER PUBLICATIONS

"3rd Generation Partnership Project; Technical Specification Group Services and System Aspects; Study on enhanced support of Non-Public Networks (NPN) (Release 17)", 3GPP Standard; Technical Report; 3GPP TR 23.700-07, No. V17.0.0 Mar. 31, 2021 (Mar. 31, 2021), pp. 1-248, XP052000256.*

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

International Search Report and Written Opinion received for corresponding Patent Cooperation Treaty Application No. PCT/EP2021/061680, dated Jul. 6, 2021, 18 pages.

"3rd Generation Partnership Project; Technical Specification Group Services and System Aspects; Study on enhanced support of non-public networks (Release 17)", 3GPP TR 23.700-07, VO.3.0, Jan. 2020, pp. 1-42.

"3rd Generation Partnership Project; Technical Specification Group Services and System Aspects; Study on enhanced support of Non-Public Networks (NPN) (Release 17)", 3GPP TR 23.700-07, V17.0.0, Mar. 2021, pp. 1-248.

* cited by examiner

APPARATUS, METHOD, AND COMPUTER PROGRAM

RELATED APPLICATION

This application was originally filed as PCT Application No. PCT/EP2021/061680, filed on May 4, 2021, which claims the benefit of priority of Indian Patent Application number 202041021414, filed May 21, 2020, each of which is incorporated herein by reference in their entirety.

FIELD OF THE DISCLOSURE

The present disclosure relates to an apparatus, a method, and a computer program for providing subscription data to a terminal in a cellular system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising at least one processor and at least one memory including computer code for one or more programs, the at least one memory and the computer code configured, with the at least one processor, to cause the apparatus at least to: determine that an onboarding standalone non private network and/or service provider hosting the apparatus does not own subscription data for a terminal, in response to the terminal performing an initial access to the onboarding standalone non private network and/or service provider; obtain subscription data for the terminal owned by another standalone non private network and/or service provider from a central provisioning server; and provide subscription data to the terminal.

The subscription data for the terminal may include at least one of: an identifier of the another standalone non private network and/or service provider, an identifier of a roaming group or a parameter to establish a packet data unit session.

The at least one memory and the computer program code may be configured to, with the at least one processor, cause the apparatus at least to: store at the apparatus hosted by the onboarding standalone non private network subscription data for at least one other terminal owned by the onboarding standalone non private network; and provide the subscription data for the at least one other terminal to the central provisioning server The subscription data for the at least one other terminal may include at least one of: an identifier of the onboarding standalone non private network and/or service provider, an identifier of a roaming group or a parameter to establish a packet data unit session.

The at least one memory and the computer program code may be configured to, with the at least one processor, cause the apparatus at least to: determine that the onboarding standalone non private network and/or service provider hosting the apparatus owns subscription data for the at least one other terminal, in response to the at least one other terminal performing an initial access to the onboarding standalone non private network and/or service provider; and provide the subscription data for the at least one other terminal to the at least one other terminal The central provisioning server may be hosted outside the onboarding standalone non private network and/or service provider and outside the another standalone non private network and/or service provider.

The central provisioning server may be administered by the onboarding standalone non private network and/or service provider and the another standalone non private network and/or service provider.

The onboarding standalone non private network and/or service provider and the another standalone non private network and/or service provider may be part of a same roaming group.

The onboarding standalone non private network and/or service provider and the another standalone non private network and/or service provider may be part of different roaming groups.

The parameter to establish a packet data unit session may comprises at least one of: single network slice selection assistance information; a data network name; a terminal route selection policy; or a quality of service rule.

The apparatus may be a local provisioning server.

According to an aspect there is provided an apparatus comprising means for: determining that an onboarding standalone non private network and/or service provider hosting the apparatus does not own subscription data for a terminal, in response to the terminal performing an initial access to the onboarding standalone non private network and/or service provider; obtaining subscription data for the terminal owned by another standalone non private network and/or service provider from a central provisioning server; and providing subscription data to the terminal.

The subscription data for the terminal may include at least one of: an identifier of the another standalone non private network and/or service provider, an identifier of a roaming group or a parameter to establish a packet data unit session.

The apparatus may comprise means for: storing at the apparatus hosted by the onboarding standalone non private network subscription data for at least one other terminal owned by the onboarding standalone non private network; and providing the subscription data for the at least one other terminal to the central provisioning server The subscription data for the at least one other terminal may include at least one of: an identifier of the onboarding standalone non private network and/or service provider, an identifier of a roaming group or a parameter to establish a packet data unit session.

The apparatus may comprise means for: determining that the onboarding standalone non private network and/or service provider hosting the apparatus owns subscription data for the at least one other terminal, in response to the at least one other terminal performing an initial access to the onboarding standalone non private network and/or service provider; and providing the subscription data for the at least one other terminal to the at least one other terminal The central provisioning server may be hosted outside the onboarding standalone non private network and/or service provider and outside the another standalone non private network and/or service provider.

The central provisioning server may be administered by the onboarding standalone non private network and/or service provider and the another standalone non private network and/or service provider.

The onboarding standalone non private network and/or service provider and the another standalone non private network and/or service provider may be part of a same roaming group.

The onboarding standalone non private network and/or service provider and the another standalone non private network and/or service provider may be part of different roaming groups.

The parameter to establish a packet data unit session may comprises at least one of: single network slice selection assistance information; a data network name; a terminal route selection policy; or a quality of service rule.

The apparatus may be a local provisioning server.

According to an aspect there is provided an apparatus comprising circuitry configured to: determine that an onboarding standalone non private network and/or service provider hosting the apparatus does not own subscription data for a terminal, in response to the terminal performing an initial access to the onboarding standalone non private network and/or service provider; obtain subscription data for the terminal owned by another standalone non private network and/or service provider from a central provisioning server; and provide subscription data to the terminal.

The subscription data for the terminal may include at least one of: an identifier of the another standalone non private network and/or service provider, an identifier of a roaming group or a parameter to establish a packet data unit session.

The apparatus may comprise circuitry configured to: store at the apparatus hosted by the onboarding standalone non private network subscription data for at least one other terminal owned by the onboarding standalone non private network; and provide the subscription data for the at least one other terminal to the central provisioning server The subscription data for the at least one other terminal may include at least one of: an identifier of the onboarding standalone non private network and/or service provider, an identifier of a roaming group or a parameter to establish a packet data unit session.

The apparatus may comprise circuitry configured to: determine that the onboarding standalone non private network and/or service provider hosting the apparatus owns subscription data for the at least one other terminal, in response to the at least one other terminal performing an initial access to the onboarding standalone non private network and/or service provider; and provide the subscription data for the at least one other terminal to the at least one other terminal The central provisioning server may be hosted outside the onboarding standalone non private network and/or service provider and outside the another standalone non private network and/or service provider.

The central provisioning server may be administered by the onboarding standalone non private network and/or service provider and the another standalone non private network and/or service provider.

The onboarding standalone non private network and/or service provider and the another standalone non private network and/or service provider may be part of a same roaming group.

The onboarding standalone non private network and/or service provider and the another standalone non private network and/or service provider may be part of different roaming groups.

The parameter to establish a packet data unit session may comprises at least one of: single network slice selection assistance information; a data network name; a terminal route selection policy; or a quality of service rule.

The apparatus may be a local provisioning server.

According to an aspect there is provided a method comprising: determining that an onboarding standalone non private network and/or service provider hosting the apparatus does not own subscription data for a terminal, in response to the terminal performing an initial access to the onboarding standalone non private network and/or service provider; obtaining subscription data for the terminal owned by another standalone non private network and/or service provider from a central provisioning server; and providing subscription data to the terminal.

The subscription data for the terminal may include at least one of: an identifier of the another standalone non private network and/or service provider, an identifier of a roaming group or a parameter to establish a packet data unit session.

The method may comprise: storing hosted by the onboarding standalone non private network subscription data for at least one other terminal owned by the onboarding standalone non private network; and providing the subscription data for the at least one other terminal to the central provisioning server The subscription data for the at least one other terminal may include at least one of: an identifier of the onboarding standalone non private network and/or service provider, an identifier of a roaming group or a parameter to establish a packet data unit session.

The method may comprise: determining that the onboarding standalone non private network and/or service provider hosting the apparatus owns subscription data for the at least one other terminal, in response to the at least one other terminal performing an initial access to the onboarding standalone non private network and/or service provider; and providing the subscription data for the at least one other terminal to the at least one other terminal The central provisioning server may be hosted outside the onboarding standalone non private network and/or service provider and outside the another standalone non private network and/or service provider.

The central provisioning server may be administered by the onboarding standalone non private network and/or service provider and the another standalone non private network and/or service provider.

The onboarding standalone non private network and/or service provider and the another standalone non private network and/or service provider may be part of a same roaming group.

The onboarding standalone non private network and/or service provider and the another standalone non private network and/or service provider may be part of different roaming groups.

The parameter to establish a packet data unit session may comprises at least one of: single network slice selection assistance information; a data network name; a terminal route selection policy; or a quality of service rule.

The method may be performed by a local provisioning server.

According to an aspect there is provided a computer program comprising computer executable code which when run on at least one processor is configured to: determine that an onboarding standalone non private network and/or service provider hosting the apparatus does not own subscription data for a terminal, in response to the terminal performing an initial access to the onboarding standalone non private network and/or service provider; obtain subscription data for the terminal owned by another standalone non private network and/or service provider from a central provisioning server; and provide subscription data to the terminal.

The subscription data for the terminal may include at least one of: an identifier of the another standalone non private network and/or service provider, an identifier of a roaming group or a parameter to establish a packet data unit session.

The computer program may comprise computer executable code which when run on at least one processor is configured to: store at the apparatus hosted by the onboarding standalone non private network subscription data for at least one other terminal owned by the onboarding standalone non private network; and provide the subscription data for the at least one other terminal to the central provisioning server The subscription data for the at least one other terminal may include at least one of: an identifier of the onboarding standalone non private network and/or service provider, an identifier of a roaming group or a parameter to establish a packet data unit session.

The computer program may comprise computer executable code which when run on at least one processor is configured to: determine that the onboarding standalone non private network and/or service provider hosting the apparatus owns subscription data for the at least one other terminal, in response to the at least one other terminal performing an initial access to the onboarding standalone non private network and/or service provider; and provide the subscription data for the at least one other terminal to the at least one other terminal The central provisioning server may be hosted outside the onboarding standalone non private network and/or service provider and outside the another standalone non private network and/or service provider.

The central provisioning server may be administered by the onboarding standalone non private network and/or service provider and the another standalone non private network and/or service provider.

The onboarding standalone non private network and/or service provider and the another standalone non private network and/or service provider may be part of a same roaming group.

The onboarding standalone non private network and/or service provider and the another standalone non private network and/or service provider may be part of different roaming groups.

The parameter to establish a packet data unit session may comprises at least one of: single network slice selection assistance information; a data network name; a terminal route selection policy; or a quality of service rule.

The at least one processor may be part of a local provisioning server.

According to an aspect there is provided an apparatus comprising at least one processor and at least one memory including computer code for one or more programs, the at least one memory and the computer code configured, with the at least one processor, to cause the apparatus at least to: receive a query to obtain subscription data owned by a standalone non private network and/or service provider for a terminal from a local provisioning server hosted by an onboarding standalone non private network and/or service provider; and provide the subscription data owned by the standalone non private network and/or service provider for the terminal to the local provisioning server.

The apparatus may be hosted outside the onboarding standalone non private network and/or service provider.

The apparatus is administered by the standalone non private network and/or service provider and the onboarding standalone non private network and/or service provider.

The at least one memory and the computer program code may be configured to, with the at least one processor, cause the apparatus at least to: receive and store subscription data owned by the standalone non private network and/or service provider for the terminal from a local provisioning server hosted by the standalone non private network and/or service provider.

The at least one memory and the computer program code may be configured to, with the at least one processor, cause the apparatus at least to: receive and store subscription data owned by the onboarding standalone non private network and/or service provider for another terminal from the local provisioning server hosted by the onboarding standalone non private network and/or service provider.

The at least one memory and the computer program code may be configured to, with the at least one processor, cause the apparatus at least to: receive and store subscription data owned by at least one other onboarding standalone non private network and/or service provider for at least one other terminal from the local provisioning server hosted by the at least one other onboarding standalone non private network and/or service provider.

The apparatus may be a central provisioning server.

According to an aspect there is provided an apparatus comprising means for: receiving a query to obtain subscription data owned by a standalone non private network and/or service provider for a terminal from a local provisioning server hosted by an onboarding standalone non private network and/or service provider; and providing the subscription data owned by the standalone non private network and/or service provider for the terminal to the local provisioning server.

The apparatus may be hosted outside the onboarding standalone non private network and/or service provider.

The apparatus is administered by the standalone non private network and/or service provider and the onboarding standalone non private network and/or service provider.

The apparatus may comprise means for: receiving and store subscription data owned by the standalone non private network and/or service provider for the terminal from a local provisioning server hosted by the standalone non private network and/or service provider.

The apparatus may comprise means for: receiving and store subscription data owned by the onboarding standalone non private network and/or service provider for another terminal from the local provisioning server hosted by the onboarding standalone non private network and/or service provider.

The apparatus may comprise means for: receiving and store subscription data owned by at least one other onboarding standalone non private network and/or service provider for at least one other terminal from the local provisioning server hosted by the at least one other onboarding standalone non private network and/or service provider.

The apparatus may be a central provisioning server.

According to an aspect there is provided an apparatus comprising circuitry configured to: receive a query to obtain subscription data owned by a standalone non private network and/or service provider for a terminal from a local provisioning server hosted by an onboarding standalone non private network and/or service provider; and provide the subscription data owned by the standalone non private network and/or service provider for the terminal to the local provisioning server.

The apparatus may be hosted outside the onboarding standalone non private network and/or service provider.

The apparatus is administered by the standalone non private network and/or service provider and the onboarding standalone non private network and/or service provider.

The apparatus may comprise circuitry configured to: receive and store subscription data owned by the standalone non private network and/or service provider for the terminal from a local provisioning server hosted by the standalone non private network and/or service provider.

The apparatus may comprise circuitry configured to: receive and store subscription data owned by the onboarding standalone non private network and/or service provider for another terminal from the local provisioning server hosted by the onboarding standalone non private network and/or service provider.

The apparatus may comprise circuitry configured to: receive and store subscription data owned by at least one other onboarding standalone non private network and/or service provider for at least one other terminal from the local provisioning server hosted by the at least one other onboarding standalone non private network and/or service provider.

The apparatus may be a central provisioning server.

According to an aspect there is provided a method comprising: receiving a query to obtain subscription data owned by a standalone non private network and/or service provider for a terminal from a local provisioning server hosted by an onboarding standalone non private network and/or service provider; and providing the subscription data owned by the standalone non private network and/or service provider for the terminal to the local provisioning server.

The method may be performed by an apparatus hosted outside the onboarding standalone non private network and/or service provider.

The method may be performed by an apparatus administered by the standalone non private network and/or service provider and the onboarding standalone non private network and/or service provider.

The method may comprise: receiving and store subscription data owned by the standalone non private network and/or service provider for the terminal from a local provisioning server hosted by the standalone non private network and/or service provider.

The method may comprise: receiving and store subscription data owned by the onboarding standalone non private network and/or service provider for another terminal from the local provisioning server hosted by the onboarding standalone non private network and/or service provider.

The method may comprise: receiving and store subscription data owned by at least one other onboarding standalone non private network and/or service provider for at least one other terminal from the local provisioning server hosted by the at least one other onboarding standalone non private network and/or service provider.

The method may be performed by a central provisioning server.

According to an aspect there is provided a computer program comprising computer executable code which when run on at least one processor is configured to: receive a query to obtain subscription data owned by a standalone non private network and/or service provider for a terminal from a local provisioning server hosted by an onboarding standalone non private network and/or service provider; and provide the subscription data owned by the standalone non private network and/or service provider for the terminal to the local provisioning server.

The at least one processor may be part of an apparatus hosted outside the onboarding standalone non private network and/or service provider.

The at least one processor may be part of an apparatus administered by the standalone non private network and/or service provider and the onboarding standalone non private network and/or service provider.

The computer program may comprise computer executable code which when run on at least one processor is configured to: receive and store subscription data owned by the standalone non private network and/or service provider for the terminal from a local provisioning server hosted by the standalone non private network and/or service provider.

The computer program may comprise computer executable code which when run on at least one processor is configured to: receive and store subscription data owned by the onboarding standalone non private network and/or service provider for another terminal from the local provisioning server hosted by the onboarding standalone non private network and/or service provider.

The computer program may comprise computer executable code which when run on at least one processor is configured to: receive and store subscription data owned by at least one other onboarding standalone non private network and/or service provider for at least one other terminal from the local provisioning server hosted by the at least one other onboarding standalone non private network and/or service provider.

The at least one processor may be part of a central provisioning server. According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

List of Abbreviations

AF: Application Function
AMF: Access Management Function
AUSF: Authentication Server Function
BS: Base Station
CN: Core Network
CPS: Central Provisioning Server
CU: Centralized Unit
DCS: Default Credential server
DL: Downlink
DN: Data Network
DNN: Data Network Name
DU: Distributed Unit
eNB: eNodeB
gNB: gNodeB
GSM: Global System for Mobile communication
HSS: Home Subscriber Server
ID: Identifier
IoT: Internet of Things
LPS: Local Provisioning Server
LTE: Long Term Evolution
NEF: Network Exposure Function
NR: New radio
MAC: Medium Access Control
MS: Mobile Station
MTC: Machine Type Communication
NF: Network Function
NG: New Generation
NPN: Non-Private Network
NSSF: Network Slice Selection Function
OSNPN: Onboarding Standalone Non-Public network
OSP: Onboarding Service Provider
PCF: Policy Control Function
PDU: Packet Data Unit
PLMN: Public Land Mobile Network
PNI-NPN: Public Network Integrated non-public network
QoS: Quality of Service
RAM: Random Access Memory
RAN: Radio Access Network
RF: Radio Frequency
RG: Roaming Group
ROM: Read Only Memory
SMF: Session Management Function
SNPN: Standalone Non-Private Network
S-NSSAI: Single Network Slice Selection Assistance Information
SP: Service Provider
TR: Technical Report
TS: Technical Specification
UDM: User Data Management
UE: User Equipment
UL: Uplink
UPF: User Plane Function
UMTS: Universal Mobile Telecommunication System
USB: Universal
URSP: User equipment Route Selection Policies
3GPP: 3$^{rd}$ Generation Partnership Project
5G: 5$^{th}$ Generation
5GS: 5G System

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
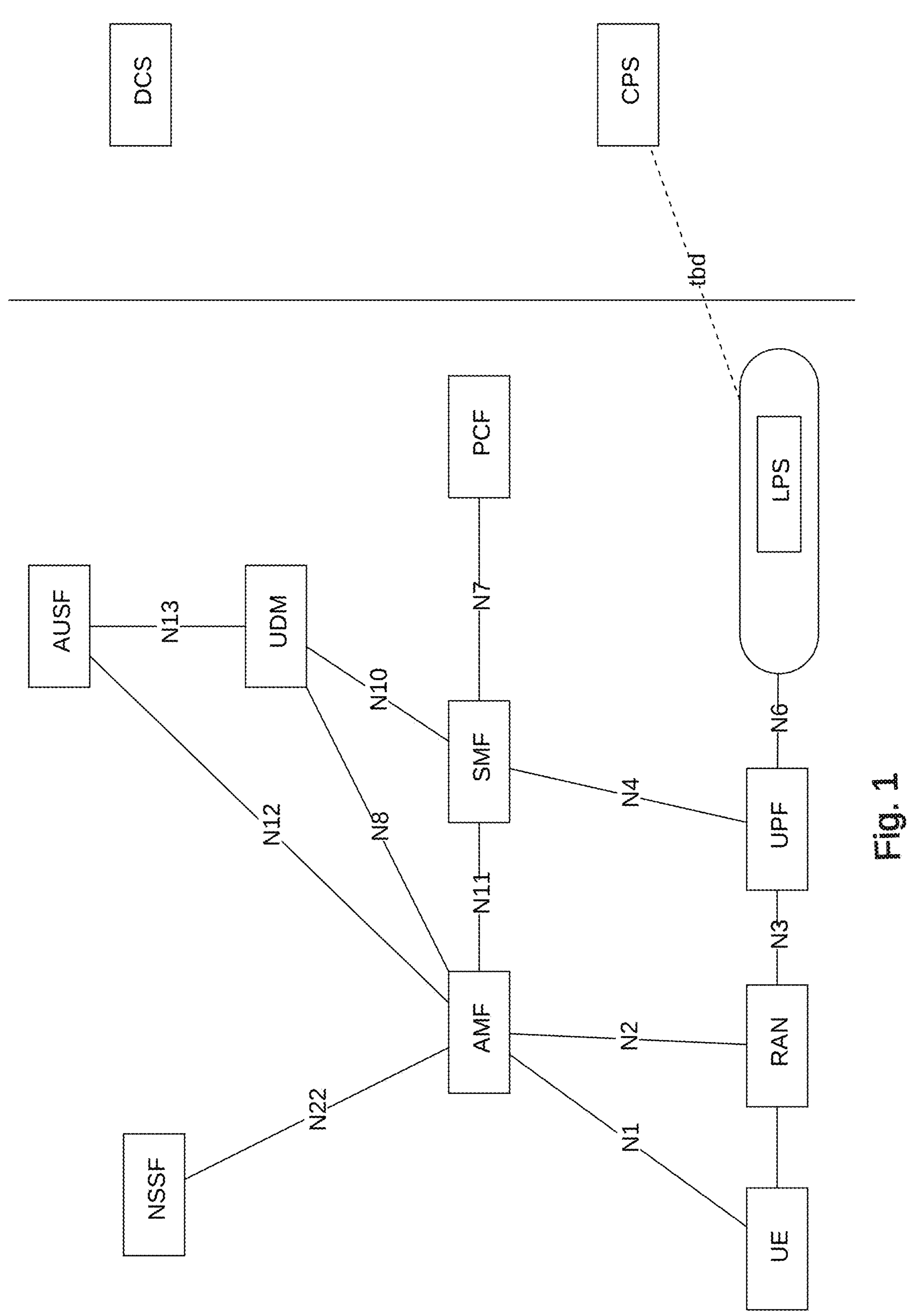
FIG. 1 shows a schematic representation of a 5G system.

FIG. 1 shows a schematic representation of a 5G system (5GS). The 5GS may comprises an onboarding standalone non-private network (OSNPN) and/or an onboarding service provider (OSP) domain. The OSNPN and/or OSP domain may comprise a user equipment (UE), a radio access network (RAN) and a core network (CN). The RAN may comprise one or more gNodeB (gNB) distributed unit functions connected to one or more gNodeB (gNB) centralized unit functions. The CN may comprise an access management function (AMF), a session management function (SMF), an authentication server function (AUSF), a user data management (UDM), a user plane function (UPF), a policy control function (PCF), a network slice selection function (NSSF) and/or a local provisioning server (LPS).

The 5GS may further comprise a central provisioning server (CPS) and/or a default credential server (DCS). The CPS and/or DCS may be outside the OSNPN and/or OSP. The CPS and/or DCS may be managed by group of SNPN and/or SP who will allow terminals to onboard through their network.

Figure 2:
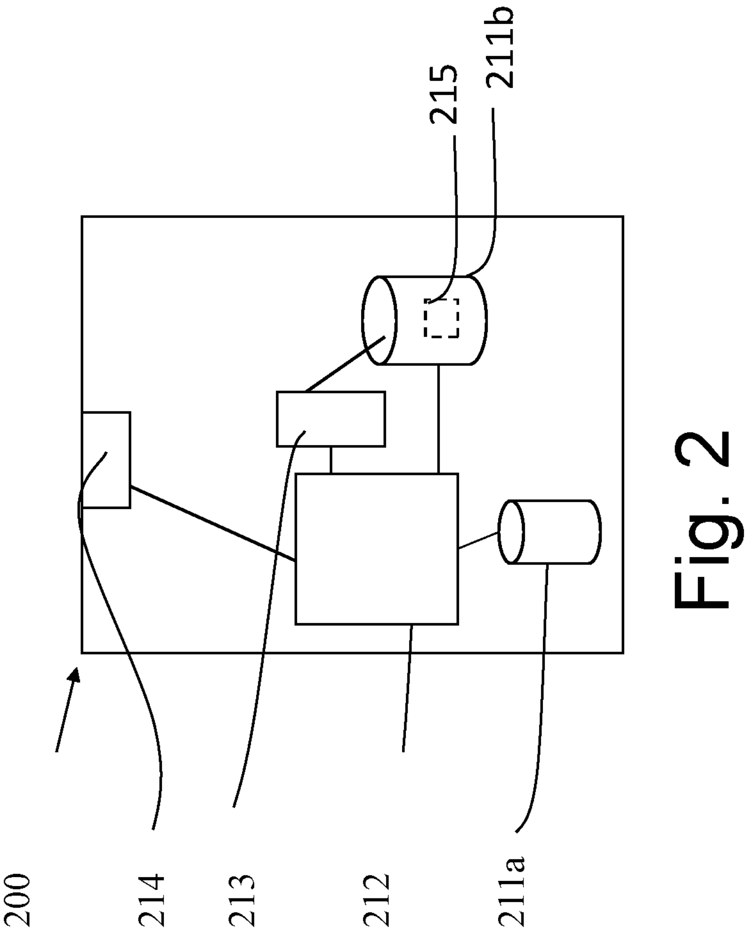
FIG. 2 shows a schematic representation of a control apparatus.

FIG. 2 illustrates an example of a control apparatus 200 for controlling a function of the RAN or the CN as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the RAN or the CN. In some embodiments, each function of the RAN or the CN comprises a control apparatus 200. In alternative embodiments, two or more functions of the RAN or the CN may share a control apparatus.

Figure 3:
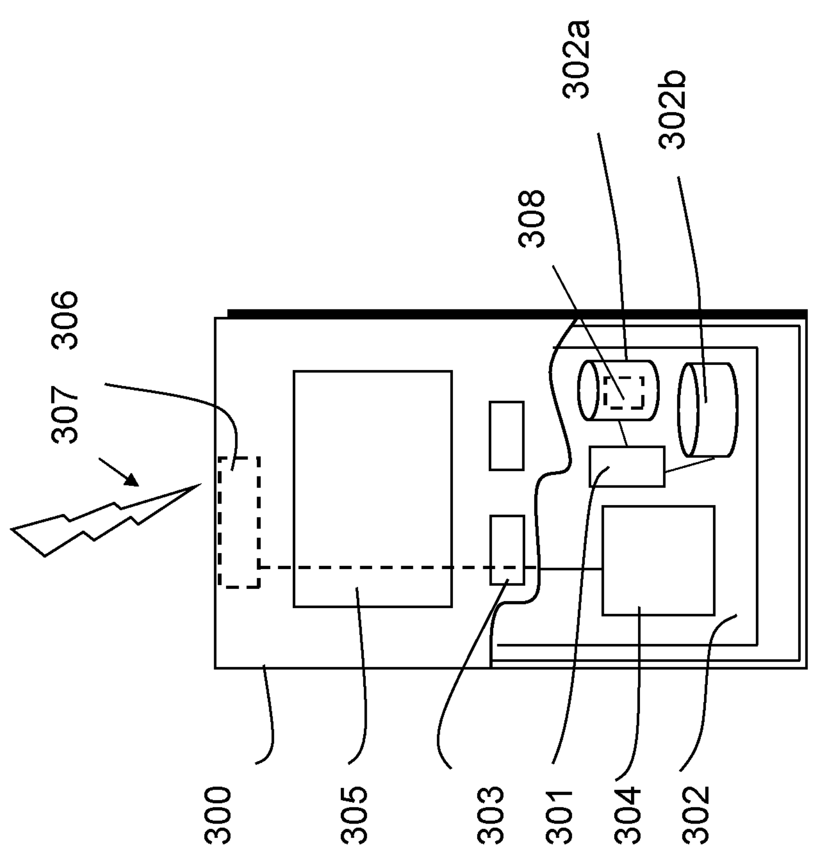
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*a* and the ROM 211*b*. The at least one processor 301 may be configured to execute an appropriate software code 308. The software code 308 may for example allow to perform one or more of the present aspects. The software code 308 may be stored in the ROM 302*b*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Industry 4.0 comprises several use cases with stringent requirements in terms of latency, reliability and high-accuracy positioning. The combination of 5G technology with enterprise network solutions becomes crucial to satisfy these requirements in indoor, private environments. In this context, the concept of non-public network (NPN) has emerged.

One or more aspect of this disclosure relate to NPNs and more specifically to the problem of onboarding a terminal (i.e. providing subscription data to a terminal) by an NPN.

There are two kinds of NPN: standalone NPN (SNPN) and public network integrated (PNI-NPN) works. TS 23.501 describe how both the SNPN and the PNI-NPN work.

TR 23.700-07 (section 5) identifies multiple key issues. One or more aspect of this disclosure relate to key issue #4: UE onboarding and remote provisioning). The key issue #4 include in particular the following problems:

"Which network entity performs UE's subscription provisioning and where is the network entity located".

"If the network entity performing UE subscription provisioning is external to the SNPN, what is the service-based interface exposed by the SNPN towards that network entity for UE onboarding and provisioning".

One or more aspect of this disclosure relate to a deployment where a terminal has a default credential and needs to be onboarded by an onboarding SNPN (OSNPN). That is, the terminal needs to be provided with subscription data by the OSNPN.

In a scenario, the terminal may be camping to the OSNPN network and the OSNPN may own subscription data for the terminal (i.e. the OSPN may be a home SNPN).

In another scenario, the terminal may be camping to the OSNPN and the OSNPN may not own the subscription (i.e. the OSPN may be different from a home SNPN). Another SNPN different from the OSNPN may own the subscription data for the terminal (i.e. the SNPN may be a home SNPN). The other SNPN and the OSNPN may be part of a same roaming group (RG) (e.g. same area).

In another scenario, the terminal may be camping to the OSNPN and the OSNPN may not own the subscription (i.e. the OSNPN may be different from a home SNPN). A first SNPN different from the OSNPN may own the subscription data for the terminal (i.e. the first SNPN may be a home SNPN for the terminal). The first SNPN and the OSNPN may be part of different RGs (e.g. different areas). A second SNPN different from the OSNPN may not own the subscription data for the terminal (i.e. the second SNPN may be different from a home SNPN). The second SNPN and the OSNPN may be part of a same RG (e.g. same area). The first SNPN and the second SNPN may be roaming partners so that the terminal may use the subscription data owned by the first SNPN for the terminal to access the second SNPN.

One or more aspects of this disclosure provide a dynamic provisioning solution for a deployment where SNPNs may be independent from service providers (SP).

Subscription data for a terminal may be owned by a SNPN and/or by a SP. Multiple SNPNs and/or SPs may be part of a same (RG. In a RG, each SNPN and/or SP may own subscription data for its own terminals (i.e. subscribers) but not for the terminals of other SNPNs and/or SPs in the RG.

One or more aspects of this disclosure introduce the concept of central provisioning server (CPS) owned by a plurality of SNPN. The plurality of SNPN may comprise an OSNPN and/or OSP and at least one other SNPN and/or SP.

A local provisioning server (LPS) may be hosted by the OSNPN and/or OSP. The LPS may be administered by the OSNPN and/or OSP.

At least one other LPS may be hosted by the at least one other SNPN and/or SP. The at least one other LPS may be administered by the at least one other SNPN and/or SP.

The CPS may not be hosted by the OSNPN and/or OSP. The CPS may be administered the OSNPN and/or OSP and the at least one other SNPN and/or SP. The OSNPN and/or the OSP and the at least one other SNPN and/or SP may have a roaming agreement to onboard terminals.

The LPS hosted by the OSNPN and/or OSP may be configured with a OSNPN identifier (ID) and/or OSP ID along with a RG ID for its own terminals (i.e. subscribers).

The LPS hosted by the at least one other SNPN and/or SP may be configured with a SNPN ID and/or SP ID along with a RG ID for its own terminals (i.e. subscribers).

The OSNPN ID and/or SP ID of the LPS hosted by the OSNPN and/or OSP may be different from the SNPN ID and/or SP ID of the LPS hosted by the at least one other SNPN and/or SP.

The RG ID of the LPS hosted by the OSNPN and/or OSP may be the same or may be different from the RG ID of the LPS hosted by the at least one other SNPN and/or SP. The RG ID of the LPS hosted by the OSNPN and/or OSP may be the same as the RG ID of the LPS hosted by the at least one other SNPN and/or SP based on a roaming agreement to onboard terminals.

The LPS hosted by the OSNPN and/or OSP may store terminal configuration parameters. The terminal configuration parameters may comprise parameters allowing the terminal to access the OSNPN and/or OSP and establish a regular PDU session. A regular PDU session may be used to make voice calls, transfer data or the like. The terminal configuration parameters may comprise PDU session parameters such as single network slice assistance information (SNSSAI), data network name (DNN), UE route selection policies (URSP) or quality of service (QoS) rules.

The LPS hosted by the OSNPN and/or OSP may provide the SNPN ID and/or SPD ID and the terminal configuration parameters for its own terminals (i.e. subscribers) to the CPS.

Likewise, the LPS hosted by the at least one other SNPN and/or SP may store terminal configuration parameters. The terminal configuration parameters may comprise to access at least one other SNPN and/or SP and establish a regular PDU session. The terminal configuration parameters may comprise PDU session parameters such as SNSSA), DNN, URSP or QoS rules.

The LPS hosted by the at least one other SNPN and/or SP may provide the SNPN ID and/or SPD ID and terminal configuration parameters for its own terminals (i.e. subscribers) to the CPS.

When a terminal camps on the OSNPN and/or OSP after initial access to the cells and successful authentication is performed with the DCS, the LPS hosted by the OSNPN and/or OSP may check whether the OSNPN and/or OSP owns subscription data for the terminal.

If the OSNPN and/or OSP owns subscription data for the terminal, the LPS hosted by the OSNPN and/or OSP may provide the subscription data for the terminal to the terminal.

Otherwise, the LPS hosted by the OSNPN and/or OSP may obtain subscription data owned by the at least one other SNPN and/or SP from the CPS and the LPS hosted by the OSNPN and/or OSP may provide the subscription data for the terminal to the terminal. The terminal may then register using the subscription data (e.g. SNPN and/or SP ID) received from the LPS hosted by the OSNPN and/or OSP.

Figure 4:
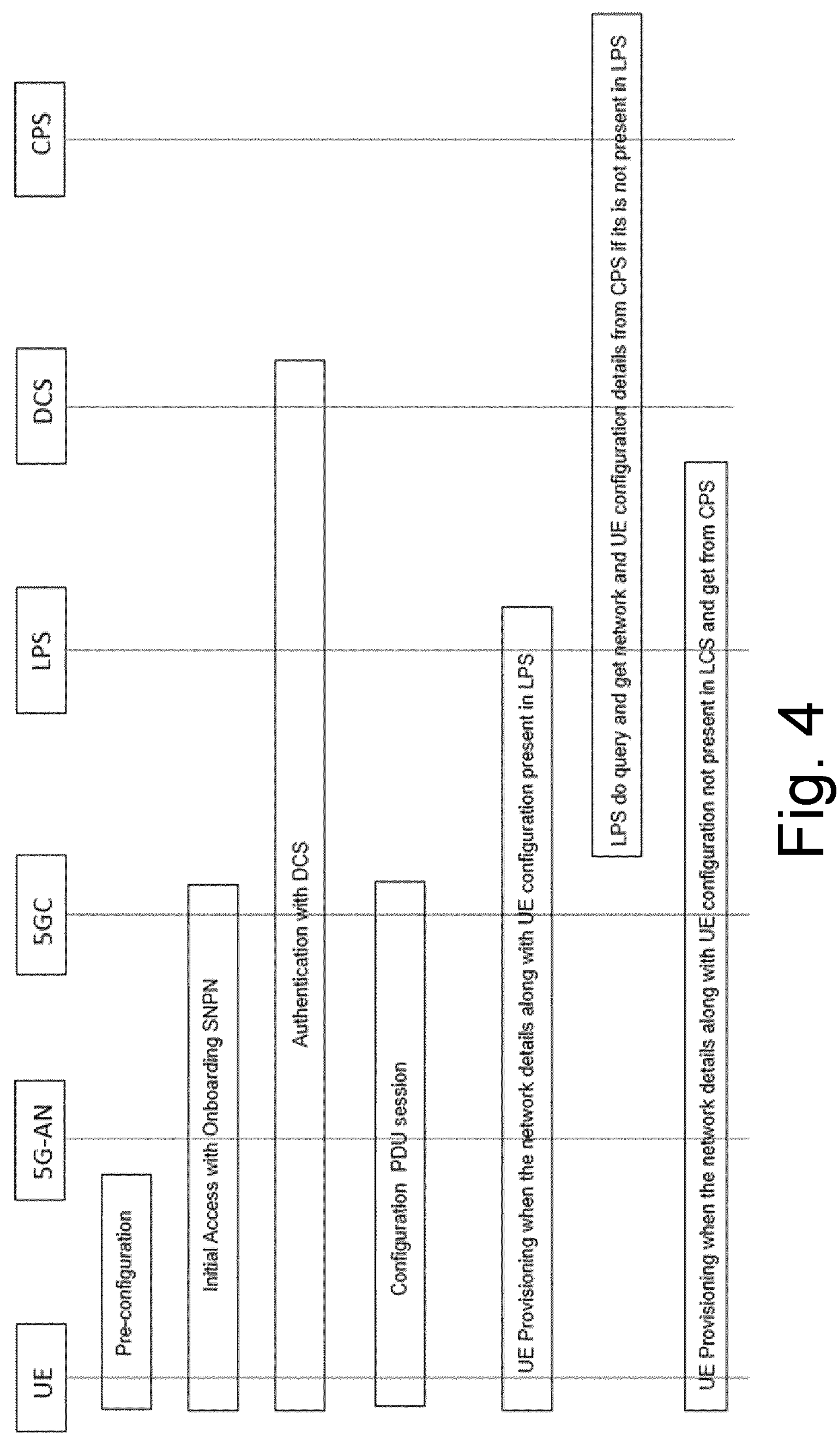
FIG. 4 shows a schematic representation of a signalling diagram of a process for providing subscription data to a terminal.

FIG. 4 shows a schematic representation of a signalling diagram of a process for providing subscription data to a terminal.

In step 1, the terminal may be pre-configured with a default credential. The default credential may comprise a permanent equipment identifier (PEI).

In step 2, the terminal may perform initial access with the OSNPN and/or OSP.

In step 3, the terminal may use the default credential to authenticate with the DCS.

In step 4, the terminal may establish a configuration PDU session with the OSNPN and/or OSP.

In step 5, if the OSNPN and/or OSP owns subscription data for the terminal (i.e. the OSNPN and/or OSP is a home SNPN and/or home SPN), the LPS hosted by the OSNPN and/or OSP may provide the subscription data for the terminal to the terminal.

In step 6, if the OSNPN and/or OSP does not own subscription data for the terminal (i.e. the OSNPN and/or OSP is different from a home SNPN and/or home SPN), the LPS hosted by the OSNPN and/or OSP may send a query to obtain subscription data for the terminal own by another SNPN and/or SP from the CPS. The LPS hosted by the OSNPN and/or OSP may provide the subscription data for the terminal to the terminal.

One or more aspect of this disclosure relate to a LPS. A LPS may be one of the network nodes of a SNPN and/or SP. A CPS address may be configured at the LPS. A terminal manufacturer or SNPN and/or SP subscription owner may configure the LPS hosted by the SNPN and/or SP with subscriber data for terminals.

The LPS may be configured with the SNPN ID and/or SP ID (e.g. S-NPN1 and/or SP1) along with RG ID (e.g. RG1) for all the terminals for which the SNPN and/or SP owns subscription data. The RG ID may be based on a roaming agreement between SNPNs/SPs. The LPS may also store configuration parameters (e.g. PDU session parameters, such as SNSSAI, DNN, URSPs, QoS rules, and other required parameters to access the SNPN and establish a regular PDU session) for all the terminals for which the SNPN and/or SP owns subscription data.

PEI may be assumed to be the default credential present in a terminal and so used as key to obtain subscription data. After configuration is done successfully at the LPS of the SNPN and/or SP, the LPS may provide the subscription data to the CPS.

| Terminal | LPS (S-NPN1/SP1) | CPS |
|---|---|---|
| PEI1 | PEI1: S-NPN1/SP1, RG1, terminal configuration parameter | PEI1: S-NPN1/SP1, RG1, terminal (configuration parameter |

Subsequently, another terminal manufacturer or another SNPN and/or SP subscription owner (S-NPN2/SP2) may configure another LPS hosted by the other SNPN and/or SP with subscriber data for other terminals.

The LPS may be configured with another SNPN ID and/or SP ID (e.g. S-NPN2 and/or SP2) along with another RG ID (e.g. RG2) for all the terminals for which the SNPN and/or SP owns subscription data. The RG ID may be based on a roaming agreement between SNPNs/SPs. The LPS may also store configuration parameters (e.g. PDU session parameters, such as SNSSAI, DNN, URSPs, QoS rules, and other required parameters to access the SNPN and establish a regular PDU session) for all the terminals for which the SNPN and/or SP owns subscription data.

| Terminal | LPS (S-NPN2/SP2) | CPS1 |
|---|---|---|
| PEI2 | PEI2: S-NPN2/SP2, RG2, terminal configuration parameter | PEI1: S-NPN1/SP1, RG1, terminal configuration parameter<br>PEI2: S-NPN2/SP2, RG2, terminal configuration parameter |

It will be understood that when the LPS is subsequently configured (like providing subscription data for another terminal or modifying subscription data for a terminal) then the LPS may provide the whole content or the delta content to the CPS Whenever a terminal attaches to the SNPN and/or SP hosting the LPS, the terminal may be provided with subscription data for the terminal from the LPS if the SNPN owns subscription data for the terminal (i.e. if the LPS is configured with subscription data for the terminal). If the SNPN does not owns subscription data for the terminal (i.e. if the LPS is not configured with subscription data for the terminal), the LPS may query subscription data for the terminal owned by another SNPN and/SP from the CPS and then provides the subscription data for the terminal to the terminal.

One or more aspect of this disclosure relate to a CPS. The CPS may receive subscription data for terminals from several LPS. The CPS may be updated upon receiving subscription data for a new terminal or receiving a modification to subscription data for an existing terminal. The CPS may provide subscription data for a terminal to a LPS upon receiving a query from the LPS to obtain the subscription data for the terminal.

| CPS |
|---|
| PEI1: S-NPN1/SP1, RG1, terminal configuration parameter<br>PEI2: S-NPN2/SP2, RG2, terminal configuration parameter |

Three scenarios may be contemplated. In these three scenarios UE1 is pre-configured with default credential PEI 1, UE2 is pre-configured with default credential PEI2. SNPN1 and/or SP1 operates as an OSNPN and/or OSP.

In a first scenario, SNPN1 and/or SP1 owns subscriber data for the UE1. That is, SNPN1 and/or SP1 is nota home SNPN and/or SP for the UE1.

UE1 with default credential PEI1 may perform initial access with S-NPN1 and/or SP1 and may register with SNPN1 and/or SP1. LPS hosted by the S-NPN1/SP1 may provide subscription data for UE1 to UE1 (PEI1: S-NPN1/SP1, RG1, UE1 configuration parameter).

The initial access with S-NPN1 and/or SP1 is performed with default credential PEI1. Hence, UE1 may only get onboarding service (i.e. UE1 is provided with subscription data for UE1). After the onboarding procedure is completed, UE1 may deregister from S-NPN1 and/or SP1 and again register to SNPN1 and/or SP1 using the SNPN1 ID and/or SP1 ID to get normal service (as opposed to onboarding service). The normal service may be used to perform video calls, voice calls or transfer data.

In a second scenario, SNPN1 and/or SP1 does not own subscriber data for UE2. That is, SNPN1 and/or SP1 is not a home SNPN and/or SP for UE2. SNPN2 and/or SP2 owns subscriber data for UE2 and is available.

UE2 with default credential PEI2 may perform initial access with SNPN1 and/or SP1 and may register with SNPN1 and/or SP1. LPS hosted by the S-NPN1/SP1 may query CPS to obtain subscription data for UE2 (PEI2: S-NPN2/SP2, RG2, UE2 configuration parameter). LPS hosted by the S-NPN1/SP1 may provide subscription data for UE2 to UE2.

The initial access with S-NPN1 and/or SP1 is performed with default credential PEI2. Hence, UE2 may only get onboarding service (i.e. UE2 is provided with subscription data for UE2). After the onboarding procedure is completed, UE2 may deregister from S-NPN1 and/or SP1. UE2 may try to discover cells broadcasting SNPN2 ID and/or SP2 ID. Upon discovering a cell broadcasting SNPN2 ID and/or SP2 ID, UE2 may register with SNPN2 and/or SP2 via the cell to get normal service (as oppose to onboarding service).

In a third scenario, SNPN1 and/or SP1 does not own subscriber data for UE2. That is, SNPN1 and/or SP1 is not a home SNPN and/or SP for UE2. SNPN2 and/or SP2 owns subscriber data for UE2 and is not available.

UE2 with default credential PEI2 may perform initial access with SNPN1 and/or SP1 and may register with SNPN1 and/or SP1. LPS hosted by the S-NPN1/SP1 may query CPS to obtain subscription data for UE2 (PEI2: S-NPN2/SP2, RG2, UE2 configuration parameter). LPS hosted by the S-NPN1/SP1 may provide subscription data for UE2 to UE2.

The initial access with S-NPN1 and/or SP1 is performed with default credential PEI2. Hence, UE2 may only get onboarding service (i.e. UE2 is provided with subscription data for UE2). After the onboarding procedure is completed, UE2 may deregister from S-NPN1 and/or SP1. UE2 may try to discover cells broadcasting SNPN2 ID and/or SP2 ID. Upon not discovering any cell broadcasting SNPN2 ID and/or SP2 ID, UE2 discover cells broadcasting RG2 ID. Such cell These cells may belong to a SNPN and/or SPs which is part of RG2. Upon discovering a cell broadcasting RG2 ID, UE2 may register with SNPN2 and/or SP2 via the cell to get normal service (as oppose to onboarding service).

It will be understood that initial access to OSNPN cells, authentication by DCS and getting provisioning server address as part of configuration PDU session may be performed as per TS 23.700-07.

One or more aspect of this disclosure may provide several advantages.

Using a LPS may help a OSNPN and/or OSP to onboard a terminal when the OSNPN and/or OSPN owns subscription data for the terminal (i.e. when the OSNPN and/or SPN is a home SNPN and/or SP).

Using a remote CPS may help a OSNPN to onboard a terminal when the OSNPN does not own subscription data for the terminal (i.e. when the OSNPN and/or SPN is different from a home SNPN and/or SP).

Also, using remote CPS may allow to provide normal service (as oppose to onboarding service) using RG ID in the area where the home SNPN and/or SP is not available.

Figure 5:
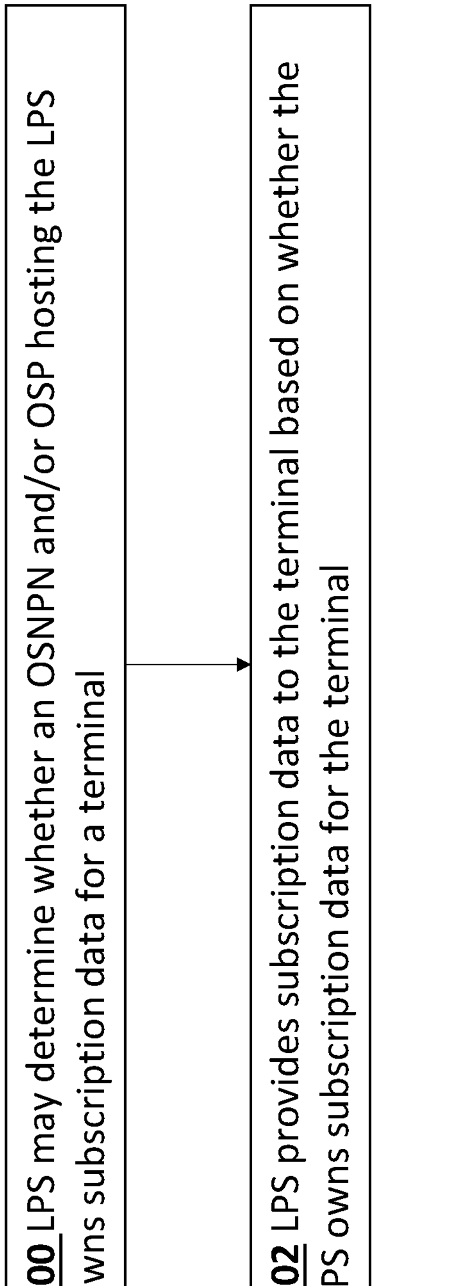
FIG. 5 shows a schematic representation of block diagram of a method performed by a local provisioning server for providing subscription data to a terminal.

FIG. 5 shows a schematic representation of block diagram of a method performed by a LPS for providing subscription data to a terminal. The LPS may be different from a DCS.

In step 500 a LPS may determine whether an OSNPN and/or OSP hosting the LPS owns subscription data for a terminal, in response to the terminal performing initial access to the OSNPN and/or OSP. The LPS may be different from a DCS.

In step 502 the LPS may provide subscription data for the terminal to the terminal based on whether the OSNPN and/or OSP hosting the LPS owns subscription data for the terminal.

In an example, the LPS may determine that the OSNPN and/or OSP hosting the LPS owns subscription data for the terminal. The LPS may then provide the subscription data for the terminal.

In another example, the LPS may determine that the OSNPN and/or OSP hosting the LPS does not own subscription data for the terminal. The LPS may obtain subscription data owned by another SNPN and/or SP for the terminal from a CPS. The LPS may then provide the subscription data owned by the other SNPN and/or SP for the terminal to the terminal. The CPS may be hosted outside the OSNPN and/or OSP. The OSNPN and/or OSP and the other SNPN and/or SP may be part of a same RG. The OSNPN and/or OSP and the other SNPN and/or SP may be part of different RGs.

The CPS may is hosted outside the OSNPN and/or OSP and outside the other SNPN and/or SP.

The CPS may be administered by the OSNPN and/or OSP and the other SNPN and/or SP.

The LPS may store subscription data for at least one terminal owned by the onboarding standalone non private network The LPS may provide the subscription data for the at least one terminal owned by the OSNPN and/or OSP to the CPS.

The subscription data for the terminal may comprises at least one of: a SNPN ID, a SP ID, a RG ID or a parameter to establish a PDU session.

The parameter to establish a PDU session may comprise at least one of: SNSSAI, a DNN, a URSP or a QoS rule.

Figure 6:
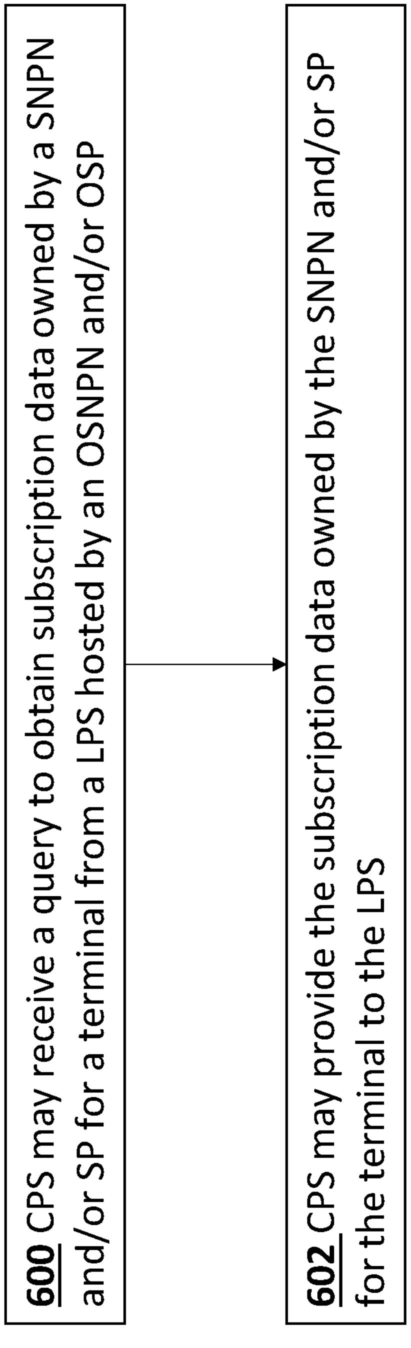
FIG. 6 shows a schematic representation of block diagram of a method performed by a central provisioning server for providing subscription data to a terminal.

FIG. 6 shows a schematic representation of block diagram of a method performed by a CPS for providing subscription data to a terminal.

In step 600 a CPS may receive a query to obtain subscription data owned by a SNPN and/or SP for a terminal from a LPS hosted by an OSNPN and/or OSP.

In step 602 the CPS may provide the subscription data owned by the SNPN and/or SP for the terminal to the LPS.

The CPS may be hosted outside the SNPN and/or SP and outside the OSNPN and/or OSP.

The CPS may be administered by the SNPN and/or SP and the OSNPN and/or OSP.

The CPS may receive subscription data owned by the SNPN and/or SP for the terminal from a LPS hosted by the SNPN and/or SP. The CPS may store the subscription data owned by the SNPN and/or SP for the terminal.

The CPS may receive subscription data owned by the OSNPN and/or OSP from the LPS hosted by an OSNPN and/or OSP. The CPS may store the subscription data owned by the OSNPN and/or OSP for the terminal.

The CPS may receive subscription data owned by at least one other OSNPN and/or OSP from an LPS hosted by the at least one other OSNPN and/or OSP. The CPS may store the subscription data owned by the at least one other OSNPN and/or OSP for the terminal.

Figure 7:
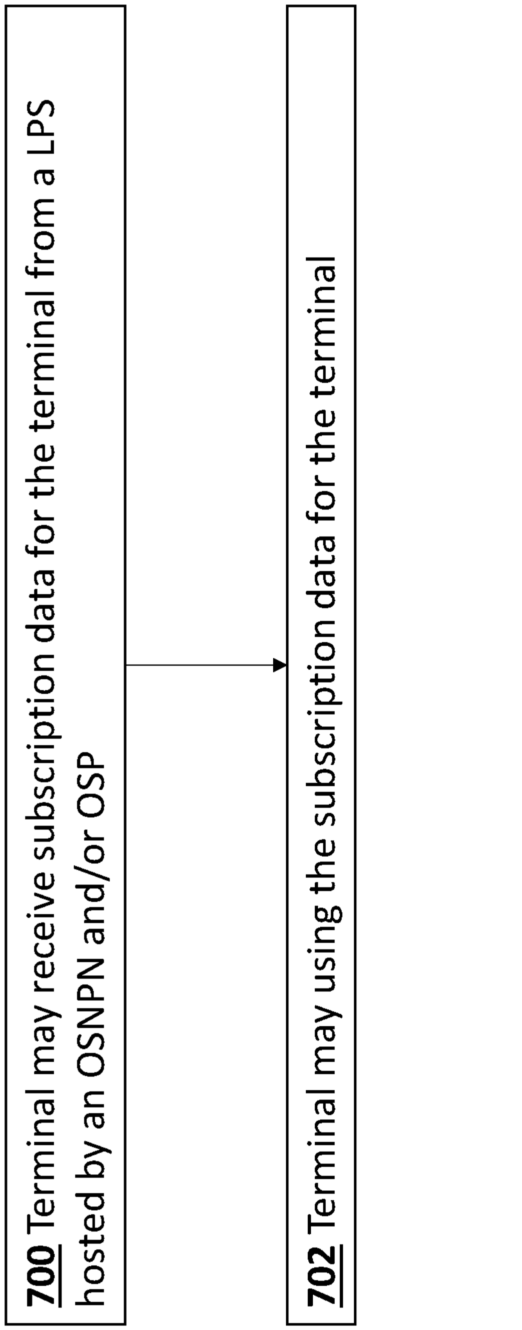
FIG. 7 shows a schematic representation of block diagram of a method performed by a terminal for being provided subscription data.

FIG. 7 shows a schematic representation of block diagram of a method performed by a terminal for being provided subscription data.

In step 700 the terminal may receive subscription data for the terminal from a LPS hosted by an OSNPN and/or OSP, in response to the terminal performing an initial access to the OSNPN and/or OSP. The LPS may be different from a DCS.

In step 702 the terminal may use the subscription data for the terminal.

In an example, the subscription data for the terminal may be owned by the OSNPN and/or OSP. The terminal may use the subscription data for the terminal to access the OSNPN and/or OSP.

In another example, the subscription data for the terminal may be owned by another SNPN and/or SP. The terminal may use the subscription data for the terminal to access the other SNPN and/or SP.

In another example, the subscription data for the terminal may be owned by a first other SNPN and/or SP. The terminal may using the subscription data for the terminal to access a second other SNPN and/or SP part of a same RG as the first other SNPN and/or SP.

Figure 8:
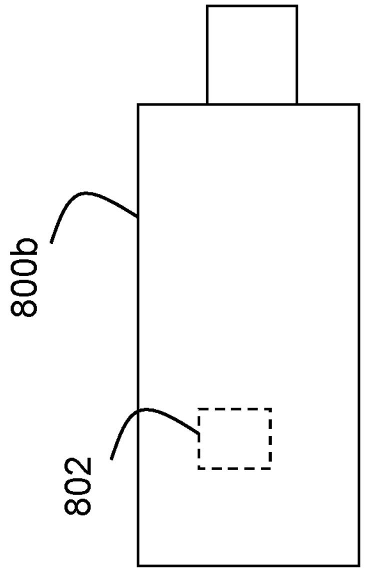
FIG. 8 shows a schematic representation of a non-volatile memory medium storing instructions which when executed by a processor allow a processor to perform one or more of the steps of the methods of FIGS. 5 to 7.
Figure 8:
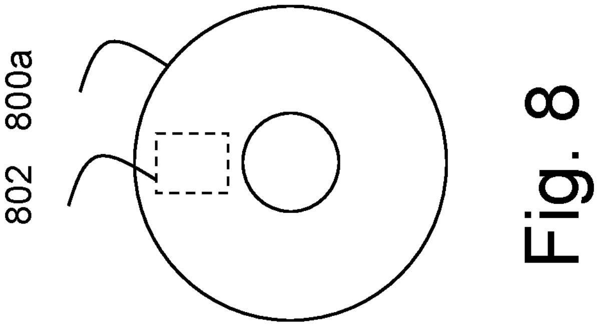

FIG. 8 shows a schematic representation of non-volatile memory media 800*a* (e.g. computer disc (CD) or digital versatile disc (DVD)) and 800*b* (e.g. universal serial bus (USB) memory stick) storing instructions and/or parameters 802 which when executed by a processor allow the processor to perform one or more of the steps of the methods of FIGS. 5 to 7.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 5 to 7, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A local provisioning server of a first standalone non-public network, the local provisioning server comprising:

at least one processor; and at least one memory including computer program code;

wherein the computer program code, when executed by the at least one processor, causes the local provisioning server to perform operations, the operations comprising:

receiving, from a terminal camping to the first standalone non-public network, a default credential to be used by the first standalone non-public network to onboard the terminal, the default credential comprising a permanent equipment identifier of the terminal;

determining, based on the permanent equipment identifier of the terminal, whether the local provisioning server is storing subscription data for the terminal in association with the permanent equipment identifier of the terminal;

based on determining that the local provisioning server is not storing the subscription data for the terminal in association with the permanent equipment identifier of the terminal:

determining that the first standalone non-public network does not own the subscription data for the terminal;

sending, to a central provisioning server located outside the first standalone network and a second standalone non-public network which is different than the first standalone non-public network, a query to retrieve the subscription data for the terminal, wherein the subscription data for the terminal is stored at the central provisioning server in association with the permanent equipment identifier of the terminal, wherein the subscription data for the terminal is owned by the second standalone non-public network, wherein the query comprises the permanent equipment identifier of the terminal, wherein the subscription data of the terminal includes an identifier of the second standalone non-public network and an identifier of a roaming group that includes the first standalone non-public network and the second standalone non-public network, and wherein the local provisioning server is configured to communicate with the central provisioning server;

in response to the query:

receiving, from the central provisioning server, the subscription data for the terminal; and providing, to the terminal, the subscription data for the terminal.

2. The local provisioning server of claim 1, wherein the subscription data for the terminal further includes a parameter used to establish a packet data unit session for the terminal.

3. The local provisioning server of claim 2, wherein the parameter used to establish a packet data unit session comprises at least one of:

single network slice selection assistance information associated with a network slice that the packet data unit session is to be established on;

a data network name of a data network that the packet data unit session is to be established with;

a terminal route selection policy of the terminal; or a quality of service rule for the packet data unit session.

4. The local provisioning server of claim 1, wherein the operations further comprise:

storing, in the at least one memory, subscription data for a second terminal that is owned by the first standalone non-public network; and providing, to the central provisioning server, the subscription data for the second terminal and a permanent equipment identifier of the second terminal to be used by the central provisioning server to store the subscription data for the second terminal in association with the permanent equipment identifier of the second terminal.

5. The local provisioning server of claim 4, wherein the subscription data for the second terminal includes a parameter to establish a packet data unit session for the second terminal.

6. The local provisioning server of claim 1, wherein the operations further comprise:

receiving, from a second terminal camping to the first standalone non-public network, a default credential for onboarding the second terminal to the first standalone non-public network, the default credential comprising a permanent equipment identifier of the second terminal;

determining, based on the permanent equipment identifier of the second terminal camping to the first standalone non-public network, whether the local provisioning server is storing the subscription data for the second terminal in association with the permanent equipment identifier of the second terminal; and based on determining that the local provisioning server is storing subscription data for the second terminal in association with the permanent equipment identifier of the second terminal:

determining that the first standalone non-public network owns the subscription data for the second terminal; and providing, to the second terminal, the subscription data for the second terminal.

7. The local provisioning server of claim 1, wherein the central provisioning server is administered by the first standalone non-public network and the second standalone non-public network.

8. A central provisioning server comprising:

at least one processor; and at least one memory including computer program code;

wherein the computer program code, when executed by the at least one processor, causes the apparatus to perform operations, the operations comprising:

receiving, from a local provisioning server hosted by a first standalone non-public network that is onboarding a terminal that is camping to the first standalone non-public network, a query for subscription data for the terminal, wherein the subscription data for the terminal is owned by a second standalone non-public network, and wherein the query comprises a permanent equipment identifier of the terminal; and in response to the query, retrieving, from the at least one memory, the subscription data for the terminal that is stored in the at least one memory in association with the permanent equipment identifier of the terminal, wherein the subscription data for the terminal includes an identifier of the second standalone non-public network and an identifier of a roaming group of standalone non-public networks that includes the first standalone non-public network and the second standalone non-public network; and after retrieving, from the at least one memory, the subscription data for the terminal, providing, to the local provisioning server, the subscription data for the terminal;

wherein the central provisioning server is located outside the first standalone non-public network and the second standalone network; and wherein the central provisioning server is configured to communicate with the location provisioning server of the first standalone non-public network and with a location provisioning server of the second standalone network.

9. The central provisioning server of claim 8, wherein the central provisioning server is administered by the first standalone non-public network and the second standalone non-public network.

10. The central provisioning server of claim 8, wherein the operations further comprise:

receiving, from the local provisioning server hosted by of the second standalone non-public network, the subscription data for the terminal that is owned by the second standalone non-public network and the permanent equipment identifier of the terminal; and storing, in the at least one memory, the subscription data for the second terminal in association with the permanent equipment identifier of the terminal.

11. The central provisioning server of claim 8, wherein the operations further comprise:

receiving, from the local provisioning server of the first standalone non-public network, subscription data for a second terminal that is owned by the first onboarding standalone non-public network and a permanent equipment identifier of the second terminal; and storing, in the at least one memory, subscription data for the second terminal that is owned by the first standalone non-public network in association with the permanent equipment identifier of the second terminal.

12. The central provisioning server of claim 8, wherein the operations further comprise:

receiving, from the local provisioning server of a second standalone non-public network, the subscription data for the second terminal that is owned by the second standalone non-public network; and storing the subscription data for the second terminal that is owned by the second standalone non-public network in association with a permanent equipment identifier of the second terminal.

13. A method comprising:

receiving, by a location provisioning server of a first standalone non-public network, from a terminal camping to the first standalone non-public network, a default credential to be used by the first standalone non-public network to onboard the terminal, the default credential comprising a permanent equipment identifier of the terminal;

determining, by the location provisioning server of the first standalone non-public network, based on the permanent equipment identifier of the terminal, whether the local provisioning server is storing subscription data for the terminal in association with the permanent equipment identifier of the terminal;

based on determining, by the location provisioning server of the first standalone non-public network, that the local provisioning server is not storing the subscription data for the terminal in association with the permanent equipment identifier of the terminal in the at least one memory:

determining, by the location provisioning server of the first standalone non-public network that the first standalone non-public network does not own the subscription data for the terminal;

sending, by the location provisioning server of the first standalone non-public network to a central provisioning server located outside the first standalone network and a second standalone non-public network which is different than the first standalone non-public network, a query to obtain the subscription data of the terminal stored at the central provisioning server in association with the permanent equipment identifier of the terminal, wherein the subscription data of the terminal is owned by the second standalone non-public network, wherein the subscription data of the terminal includes an identifier of the second standalone non-public network and an identifier of a roaming group that includes the first standalone non-public network and the second standalone non-public network, wherein the query comprises the permanent equipment identifier of the terminal, and wherein the location provisioning server of the first standalone non-public network is configured to communicate with the central provisioning server;

in response to the query:

receiving, by the location provisioning server of the first standalone non-public network, from the central provisioning server, the subscription information for the terminal; and providing, by the location provisioning server of the first standalone non-public network to the terminal, the subscription information for the terminal.

14. The method of claim 13, wherein the subscription information for the terminal includes a parameter used to establish a packet data unit session for the second terminal.

15. The method of claim 13, further comprising:

storing, by the location provisioning server of the first standalone non-public network, subscription data for a second terminal that is owned by the first standalone non-public network; and providing, by the location provisioning server of the first standalone non-public network to the central provisioning server, the subscription data.

16. The method of claim 15, wherein the subscription data for the second terminal includes a parameter used to establish a packet data unit session for the second terminal.

17. The method of claim 13, further comprising:

receiving, by the location provisioning server of the first standalone non-public network, from a second terminal camping to the first standalone non-public network, a default credential for onboarding the second terminal to the first standalone non-public network, the default credential comprising a permanent equipment identifier of the second terminal;

determining, by the location provisioning server of the first standalone non-public network, based on the permanent equipment identifier of the second terminal camping to the first standalone non-public network, whether the local provisioning server is storing the subscription data for the second terminal in association with the permanent equipment identifier of the second terminal;

based on determining, by the location provisioning server of the first standalone non-public network, that the first standalone non-public network hosting the local provisioning server owns the subscription data for a second terminal after initial access to a cell of the first onboarding standalone non-public network; and providing, by the location provisioning server of the first standalone non-public network, to the second terminal, the subscription data for the second terminal.

* * * * *